Jan. 16, 1951 F. H. POLE, JR 2,538,704
TRAILER DOLLY AND DRAWBAR ASSEMBLY
Filed Aug. 22, 1949 2 Sheets-Sheet 1
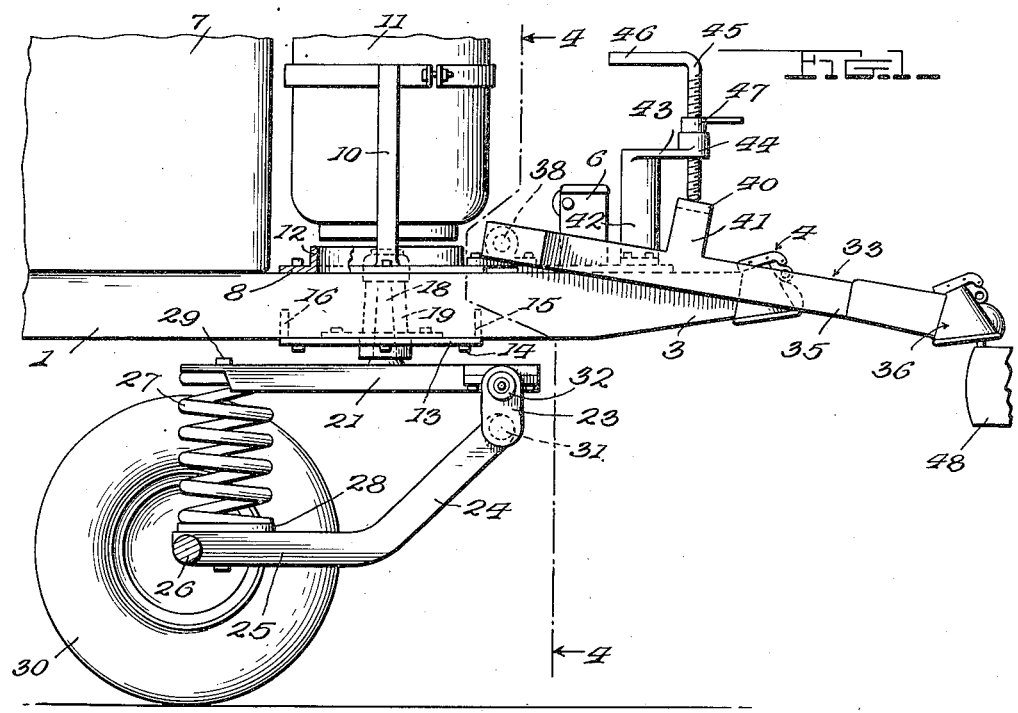
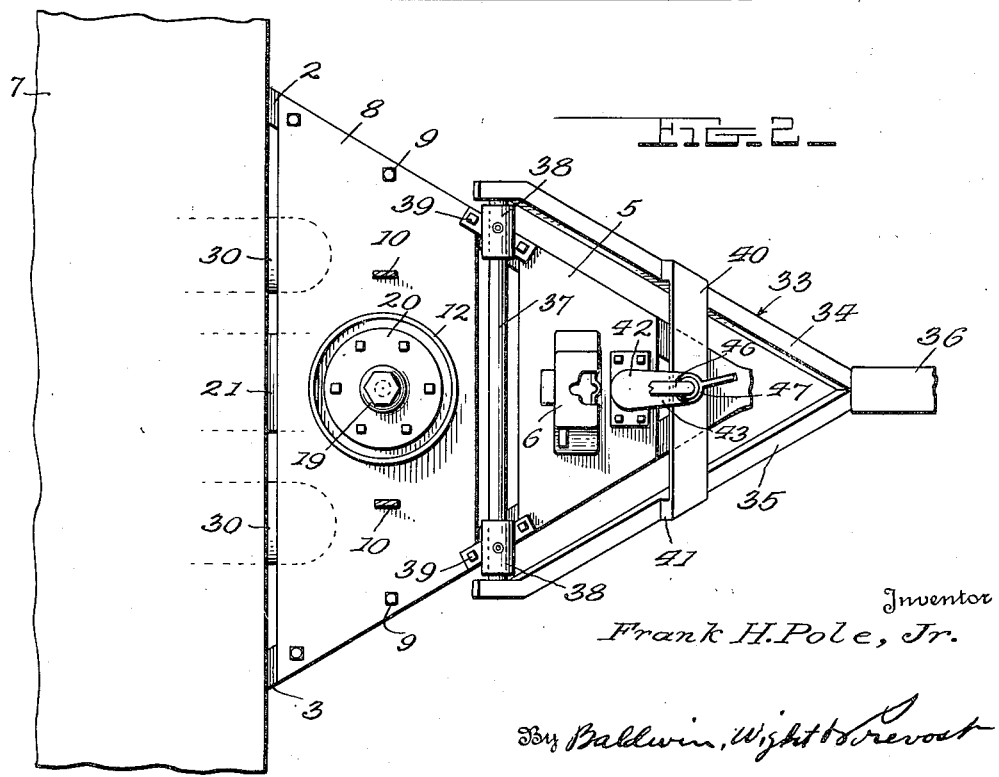
Inventor
Frank H. Pole, Jr.
By Baldwin, Wight & Prevost
Attorneys

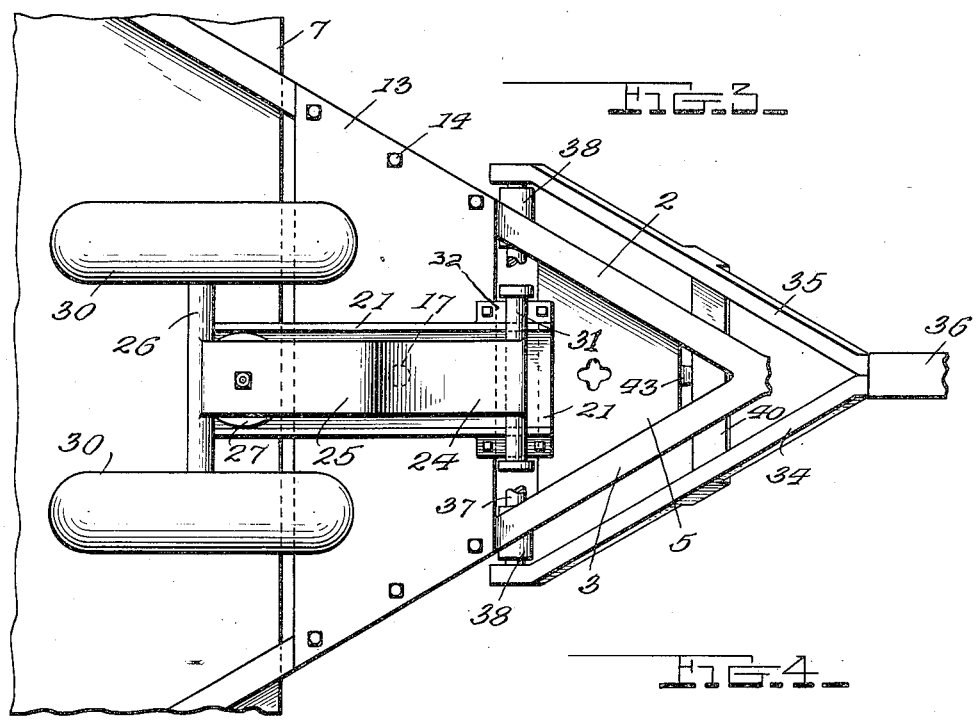
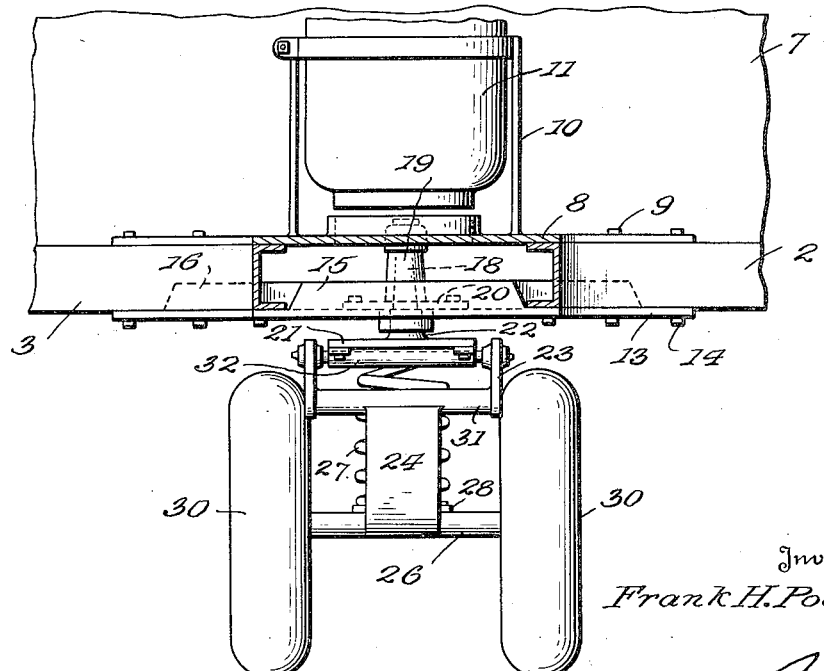

Patented Jan. 16, 1951

2,538,704

UNITED STATES PATENT OFFICE 2,538,704

TRAILER DOLLY AND DRAWBAR ASSEMBLY

Frank H. Pole, Jr., Riviera Beach, Fla.

Application August 22, 1949, Serial No. 111,667

7 Claims. (Cl. 280—33.44)

My invention consists in new and useful improvements in a combined dolly and drawbar assembly primarily designed for use in connection with house trailers and has for an object to provide a structure which is readily adaptable to the original trailer frame without the necessity of altering the front of the frame or adding the usual kick-up or raised supplemental frame portion generally employed to connect a trailer to a towing vehicle.

Another object of my invention is to provide an arrangement which will afford the maximum degree of support to the front end of a trailer frame with a minimum of stresses and strains while in motion, at the same time providing adjustable means associated with the drawbar for shifting a regulated portion of the weight of the trailer to the towing vehicle so as to maintain stability in operation and to regulate the traction of the rear wheels of the towing vehicle.

A still further object of my invention is to provide a dolly and drawbar assembly which affords a maximum utilization of the space at the forward end of the trailer for accommodating bottled gas containers, etc.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views:

Fig. 1 is a view in side elevation showing my improved dolly and drawbar assembly connected to the rear end of a towing vehicle;

Fig. 2 is a top plan view with the bottled gas container removed to better illustrate the drawbar structure and the main pivot of the dolly;

Fig. 3 is a view similar to Fig. 2 from the under side of the trailer; and

Fig. 4 is a sectional view taken on line 4—4 of Fig. 1, showing the front end of the dolly.

In the drawings, I represents the main supporting frame of a conventional house trailer of the type normally provided only with rear wheels (not shown), the forward end of said frame comprising two converging side arms 2 and 3, welded or otherwise secured together at their converging ends, where they ordinarily carry a conventional coupling or hitch 4, for connection to a towing vehicle. Usually, trailer frames of this nature are provided with a cross plate 5 for supporting a jack stand 6 which as in the case of the hitch 4, need not be removed for the installation of my improved assembly, although these elements form no necessary part of my invention.

Immediately in front of the trailer body 7, the side arms 2 and 3 support a second cross plate 8 bolted to the side arms as at 9 for supporting a bracket 10 for mounting the bottle gas container 11. The central portion of the cross plate 8 is provided with a circular aperture bounded by an upwardly extending angular flange 12 for accommodating the upper end of the main dolly pivot or hub assembly, as will later appear.

As will be seen from Figs. 3 and 4, the under side of the side arms 2 and 3 carry a dolly mounting cross plate 13 secured in place by bolts 14 and provided with upstanding stiffening flanges 15 and 16 extending transversely of the plate 13 adjacent its forward and rear edges respectively. The center of the mounting plate 13 is provided with an aperture 17 through which the spindle 18 of the hub assembly 19 projects, said hub assembly being bolted to the mounting plate by means of a circular disc 20, shown in full lines in Fig. 2, and in dotted lines in Fig. 4. Any suitable pivot or axle may be employed in connection with this structure but in my preferred form, I have found that an ordinary front hub assembly of the type used in connection with conventional motor vehicles, is entirely satisfactory.

My improved dolly consists of a horizontal flanged head plate 21 to the upper side of which the base of the spindle 18 of the hub assembly 19 is welded as at 22. The head plate 21 is substantially T-shaped in plan, as will be seen from Fig. 3, its forward end extending transversely beyond the main body portion and having bolted to its under side a shackle pin assembly 32. This shackle pin carries at each end a depending hanger 23 between which is welded the ends of a lower shackle bar 31. To the central portion of the bar 31 is welded the forward end of a suspension arm 24, the latter comprising an angularly shaped member terminating at its lower end in a substantially horizontal axle and spring supporting portion 25. A transverse axle 26 is welded to the rear end of portion 25 as shown in Fig. 1 and between the head plate 21 and said portion 25, I interpose a coil spring 27. The spring 27 is vertically disposed and has welded to its lower extremity a spacer bushing 28 for spring height adjustment, a vertical adjusting bolt 29 extending axially through the spring 27 and being secured to the head plate 21 and spring supporting portion 25 of the suspension arm. Wheels 30 of any suitable type are mounted in the conventional manner on the projecting ends of the axle 26.

Thus, I am able to mount my improved dolly directly under the forward end of the original trailer frame, placing the wheels in the proper position to afford maximum support without the necessity of an additional raised frame portion which normally constitutes a probem of installation on various types of trailer frames. Further, my invention avoids the increased distance between the trailer and the towing vehicle which ordinarily results from having to mount the dolly considerably ahead of the original trailer frame.

My improved drawbar assembly comprises a drawbar proper 33 preferably formed of two angularly disposed channel irons 34 and 35, converging at their forward ends where they are welded together and carry a hitch member 36 of any conventional design. The rear ends of these channel irons are bent to lie parallel to one another and have welded in place therebetween, a pivot bar 37 which as will be seen from Fig. 2 of the drawings, is rotatably supported at either end in a bearing member 38, fixed to the trailer frame. In the preferred form of the invention, these bearing members are provided with bottom flanges or bases 39 set at forwardly converging angles to coincide with the shape of the side members of the forward end of the trailer frame where they are bolted in place as shown. Thus, the drawbar 33 is substantially triangular in shape and is of such longitudinal and transverse dimensions as to clear the sides and front end of the forward portion of the trailer frame.

Intermediate the ends of the drawbar 33 I provide a raised cross head or abutment 40 which is preferably welded to the upper faces of the respective channel irons 34 and 35. The legs 41 of the cross head 40 are of sufficient height as shown in Fig. 1, to allow a predetermined swinging movement of the drawbar 33 with respect to the front portion of the trailer frame for the purpose hereinafter set forth.

Immediately to the rear of the cross head 40 and bolted or otherwise secured to the forward cross plate 5, is an adjusting screw stand 42 having a forwardly projecting arm 43 carrying a threaded boss 44. This boss 44 receives an adjusting screw 45 and presents the lower end thereof in line for abutment with the cross head 40, said screw preferably having at its upper end a handle 46 to facilitate adjustment. A lock nut and lever 47 on the adjusting screw 45 maintains a selected vertical adjustment of the screw.

The purpose of this feature of my invention is to adjust the angular position of the drawbar 33 with respect to the trailer frame and the towing vehicle, a fragment of the rear end of which is shown (in Fig. 1) at 48, where it is engaged by the hitch 36, so that a regulated tension may be shifted from the trailer to the towing vehicle. In other words, by screwing down on the adjusting screw 45, its end abuts the cross head 40 and causes a downward tension thereon which in turn is transmitted to the rear end 48 of the towing vehicle. This regulated tension stabilizes the operation of the two vehicles, prevents the rear end of the towing vehicle from bouncing and increases the traction on the power wheels of the towing vehicle. At the same time, due to the fact that the adjusting screw and cross head are in free abutment, the independent pivotal action of the drawbar 33 contributes to the smooth riding of both the towing vehicle and the trailer. Furthermore, under certain conditions such as on very rough roads, I can completely release all adjusting screw pressure by simply backing out the screw 45 to relieve all downward thrust on the rear end of the towing vehicle.

With my improved dolly and drawbar assembly it will be seen that the forward end of the trailer frame is adequately supported by mounting the dolly member directly under the front end of the frame where it relieves undue strain on the rear end of the towing vehicle. The location of the spring 27 with respect to the wheels 30 affords a maximum of cushioning and the structure of the head plate and suspension arm provides a strong and rugged assembly. This structure, coupled with the adjustable drawbar and its independent hinging action greatly improves the riding qualities of both the towing vehicle and the trailer.

From the foregoing it is believed that my invention may be readily understood without further description, it being borne in mind that numerous changes may be made in the details of structure without departing from the spirit of the invention as set forth in the following claims.

I claim:

1. A dolly and drawbar assembly for a trailer of the type normally unequipped with forward wheels, comprising a spring supported, wheeled dolly member, means for swivelly mounting the same directly beneath the forward end of the frame of a conventional trailer, a drawbar assembly comprising a pair of forwardly converging arms secured together at their forward ends where they are provided with a hitch member, their rear ends being mounted for vertical pivotal movement on said trailer frame, an adjusting screw support fixed on said frame, forward of the pivot points of said arms, an adjusting screw carried by said support with its lower end vertically extendible and retractable therethrough, and a cross head extending between said arms directly beneath and in line for abutment by said adjusting screw, whereby the forward end of said drawbar may be subjected to a downward tension with respect to the rear end of a towing vehicle, to distribute a predetermined thrust from said trailer.

2. A dolly and drawbar assembly for a trailer normally unequipped with forward wheels, wherein said dolly comprises a head plate swivelled directly beneath the forward end of a conventional trailer frame, an angular suspension arm shackled at one end of said head plate and carrying a transverse axle at its opposite end, a pair of wheels on said axle and a vertically disposed coil spring interposed between said cross head and suspension arm directly above said axle, said drawbar being pivotally mounted on said frame forward of said dolly assembly for vertical swinging movement with respect to said frame, means for attaching said drawbar to a towing vehicle, and adjustable means associated with said drawbar for transferring a predetermined downward thrust from said trailer frame to said towing vehicle.

3. A dolly assembly for a trailer normally unequipped with forward wheels, comprising a relatively flat, elongated head plate swivelled intermediate its ends, directly beneath the forward end of a conventional trailer frame, an angular suspension arm lying beneath said head plate and substantially within the longitudinal and lateral confines thereof, said arm being shackled at one end to the forward end of said head plate and carrying a transverse axle at its opposite end, a pair of wheels on said axle, the rear end of said head plate being extended to overlie said axle, and a vertically disposed coil spring interposed between the extended rear end of said head plate and the suspension arm, directly above said axle.

4. In a trailer having a main frame, an adjustable drawbar assembly for connecting said trailer to a towing vehicle, said assembly comprising a drawbar bifurcated at its rear end, means pivotally mounting the rear ends of the bifurcations of said drawbar directly on the forward end of said frame at aligned points posterior to the forward extremity of the frame, for vertical movement about a transverse axis, said bifurcations and their points of connection to the frame, lying within the lateral and forward confines of the frame, an adjusting screw support fixed to said frame at a point between the axis of said drawbar and the forward extremity of the frame, an adjusting screw carried by said support with its lower end vertically extendible and retractable therethrough, an abutment on said drawbar arranged for engagement by the lower end of said adjusting screw, and a coupler at the forward end of said drawbar for connection to a towing vehicle, whereby the forward end of said drawbar may be vertically adjusted with respect to the towing vehicle to maintain a variable downward tension on the latter.

5. A drawbar assembly for coupling a trailer to a towing vehicle, comprising a pair of arms pivotally mounted at their rear ends directly on the forward portion of a trailer and converging at their forward ends, said pivotal connections being arranged at aligned points posterior to the forward extremity of the trailer and the arms lying beyond the lateral and forward confines of the adjacent portion of the trailer a hitch carried by the forward ends of said arms, a vertical adjusting screw stand fixed to the trailer frame at a point forward of the pivots of said arms, a vertically adjustable screw in said support, a cross bar bridging said arms at an intermediate point between their ends in line for abutment by said screw, and means for locking said screw in a predetermined adjusted position.

6. A drawbar assembly for coupling a trailer to a towing vehicle, comprising a pair of arms pivotally mounted at their rear ends directly on the forward portion of the trailer and converging at their forward ends, said pivotal connections being arranged at aligned points posterior to the forward extremity of the trailer and the arms lying beyond the lateral and forward confines of the adjacent portion of the trailer a hitch carried by the forward ends of said arms, a vertical adjusting screw stand fixed to said trailer frame at a point forward of the pivots of said arms, a vertically adjustable screw in said support, an elevated cross bar bridging said arms at an intermediate point between their ends in line for abutment by said screw, and means for locking said screw in a predetermined adjusted position.

7. A drawbar assembly for a trailer, supported at its forward end by a dolly, said drawbar comprising a pair of arms pivotally mounted at their rear ends directly on the forward end of a trailer frame and converging at their forward ends, said pivotal connections being arranged at aligned points posterior to the forward extremity of the frame and the arms lying beyond the lateral and forward confines of the frame a hitch carried by the forward ends of said arms, a vertical adjusting screw stand fixed to said trailer frame at a point forward of the pivots of said arms, a vertically adjustable screw in said support, an elevated cross bar bridging said arms at an intermediate point between their ends in line for abutment by said screw, whereby the forward end of said drawbar may be subjected to a variable downward tension with respect to the rear end of a towing vehicle, to distribute a predetermined thrust from said trailer.

FRANK H. POLE, Jr.

REFERENCES CITED

The following references are of record in the file of this patent:

UNITED STATES PATENTS

| Number | Name | Date |
| --- | --- | --- |
| 2,396,576 | Kelley | Mar. 12, 1946 |
| 2,493,405 | Hedgpeth | Jan. 3, 1950 |